(12) United States Patent
Parrinello et al.

(10) Patent No.: US 10,279,987 B2
(45) Date of Patent: May 7, 2019

(54) METHOD AND APPARATUS FOR PRODUCING A CAPSULE, AND THE RELATED CAPSULE

(71) Applicant: SACMI COOPERATIVA MECCANICI IMOLA SOCIETA' COOPERATIVA, Imola (Bologna) (IT)

(72) Inventors: Fiorenzo Parrinello, Medicina (IT); Fabrizio Pucci, Castel Guelfo di Bologna (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 197 days.

(21) Appl. No.: 15/522,602

(22) PCT Filed: Oct. 29, 2015

(86) PCT No.: PCT/IB2015/058342
§ 371 (c)(1),
(2) Date: Apr. 27, 2017

(87) PCT Pub. No.: WO2016/067232
PCT Pub. Date: May 6, 2016

(65) Prior Publication Data
US 2017/0320657 A1    Nov. 9, 2017

(30) Foreign Application Priority Data
Oct. 29, 2014   (IT) .............................. MO2014A0309

(51) Int. Cl.
*B26D 3/08*       (2006.01)
*B65D 85/804*     (2006.01)
(Continued)

(52) U.S. Cl.
CPC ........... *B65D 85/8043* (2013.01); *B26D 3/08* (2013.01); *B26D 7/01* (2013.01); *B29C 51/266* (2013.01);
(Continued)

(58) Field of Classification Search
CPC ... B65D 85/8043; B29C 51/266; B29C 51/04; B29C 51/445; B29D 22/003;
(Continued)

(56) References Cited

U.S. PATENT DOCUMENTS 4,801,347 A * 1/1989 Garwood ............ B29C 49/0047
156/245
5,269,441 A * 12/1993 O'Meara ................ B65D 35/22
215/6
(Continued)

FOREIGN PATENT DOCUMENTS

EP    2287090 A1    2/2011
EP    2650234 A1    10/2013
(Continued)

*Primary Examiner* — Sean M Michalski
(74) *Attorney, Agent, or Firm* — Pearne & Gordon LLP

(57) ABSTRACT

A method for producing an element of a capsule, the capsule being intended to contain a product having at least one component that can be extracted by means of an extraction fluid, comprises the step of obtaining at least one preparatory zone intended to define, during use of the capsule, a passage for the extraction fluid, so that the extraction fluid can pass through the capsule in order to extract said component. The preparatory zone is obtained by means of a cutting operation carried out before the capsule is filled with the product and after the capsule element has been formed. The cutting operation is carried out by means of a blade element.

20 Claims, 7 Drawing Sheets

(51) Int. Cl.
   *B26D 7/01* (2006.01)
   *B29D 22/00* (2006.01)
   *B29C 51/26* (2006.01)
   *B29L 31/00* (2006.01)
   *B29C 51/04* (2006.01)
   *B29C 51/44* (2006.01)

(52) U.S. Cl.
   CPC ........ *B29D 22/003* (2013.01); *B26D 2210/00* (2013.01); *B29C 51/04* (2013.01); *B29C 51/445* (2013.01); *B29L 2031/7174* (2013.01)

(58) Field of Classification Search
   CPC ..... B29L 2031/7174; B26D 7/01; B26D 3/08; B26D 2210/00
   See application file for complete search history.

(56) References Cited

U.S. PATENT DOCUMENTS

| | | | | |
|---|---|---|---|---|
| 5,451,288 A * | 9/1995 | Smith | ...... | B26D 7/10 156/359 |
| 6,435,067 B1 * | 8/2002 | Irwin | ...... | B26D 7/01 264/153 |
| 6,641,319 B2 * | 11/2003 | May | ...... | B65D 25/08 264/328.12 |
| 7,581,899 B2 * | 9/2009 | May | ...... | A45D 34/04 401/132 |
| 7,624,673 B2 | 12/2009 | Zanetti | | |
| 7,976,234 B2 * | 7/2011 | May | ...... | B29C 45/0046 222/541.4 |
| 8,100,294 B2 * | 1/2012 | May | ...... | B65D 81/3272 206/219 |
| 8,485,378 B2 * | 7/2013 | Zoss | ...... | A47G 19/02 206/219 |
| 8,960,423 B2 | 2/2015 | Seelhofer | | |
| 9,162,815 B2 | 10/2015 | Yoakim et al. | | |
| 2006/0019000 A1 | 1/2006 | Zanetti | | |
| 2007/0227332 A1 * | 10/2007 | Causse | ...... | B26D 7/015 83/879 |
| 2008/0115638 A1 * | 5/2008 | Nalle, III | ...... | B26D 7/10 83/16 |
| 2009/0196675 A1 * | 8/2009 | May | ...... | B29C 45/0081 401/206 |
| 2011/0041702 A1 | 2/2011 | Yoakim et al. | | |
| 2014/0216958 A1 | 8/2014 | Seelhofer | | |
| 2015/0122818 A1 * | 5/2015 | Bruna | ...... | B65D 51/1605 220/345.6 |
| 2017/0320657 A1 * | 11/2017 | Parrinello | ...... | B29D 22/003 |

FOREIGN PATENT DOCUMENTS

| | | |
|---|---|---|
| FR | 2972180 A3 | 9/2012 |
| GB | 2503697 A | 1/2014 |
| WO | 2004087529 A1 | 10/2004 |
| WO | 2009050570 A2 | 4/2009 |
| WO | 2010038213 A2 | 4/2010 |
| WO | 2014026852 A1 | 2/2014 |

* cited by examiner

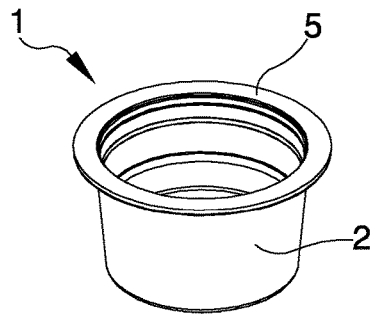
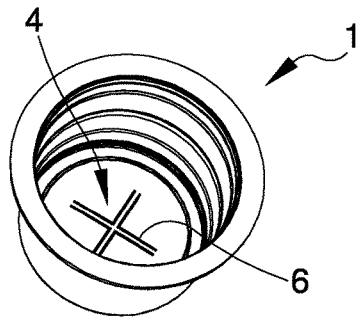
Fig. 1  Fig. 2
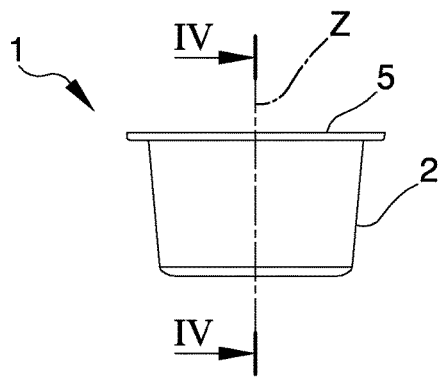
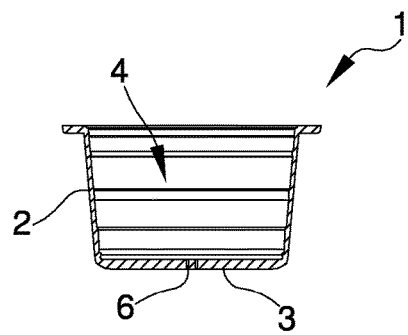
Fig. 3  Fig. 4
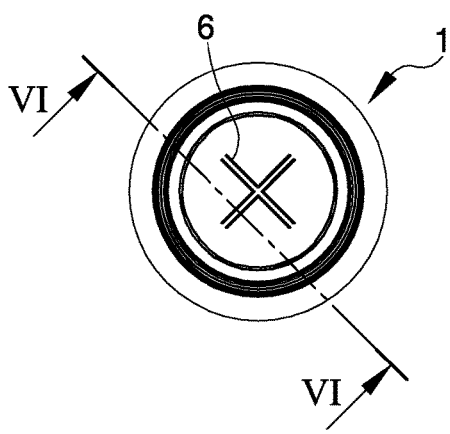
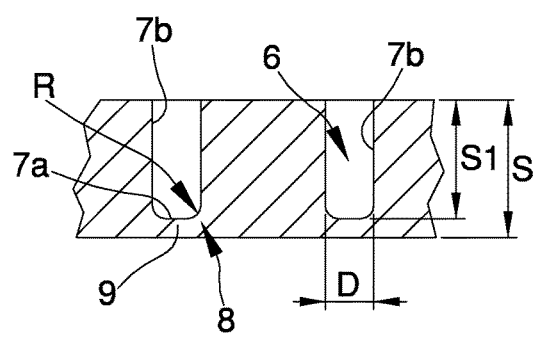
Fig. 5  Fig. 6

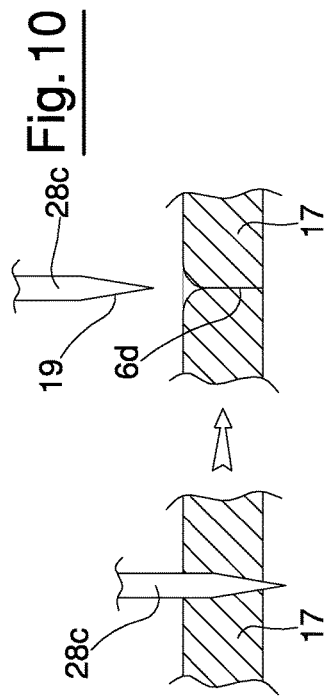
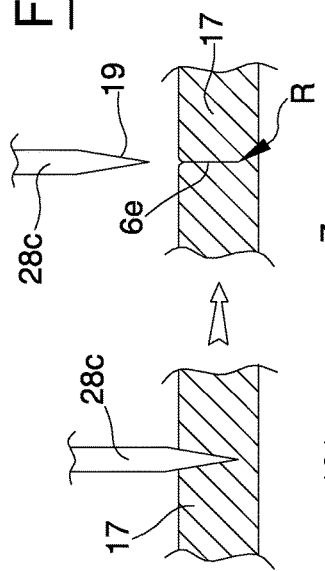
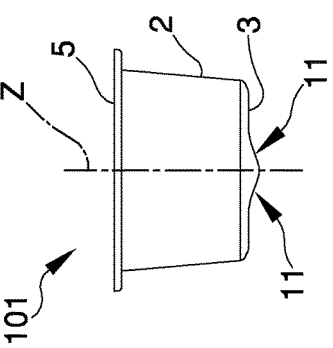
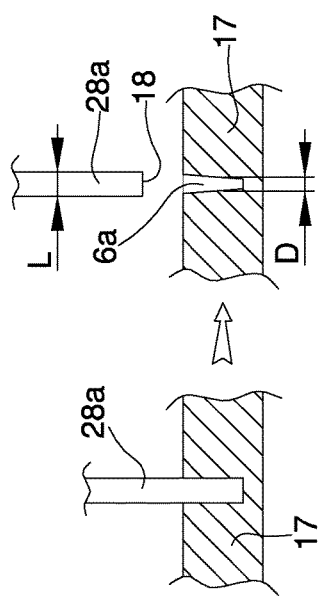
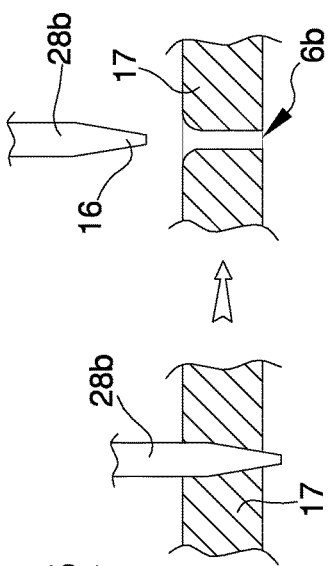
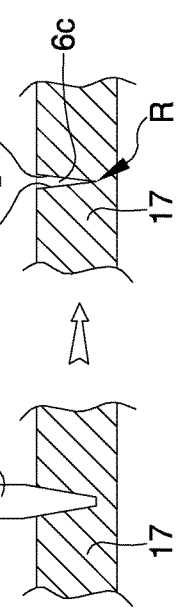

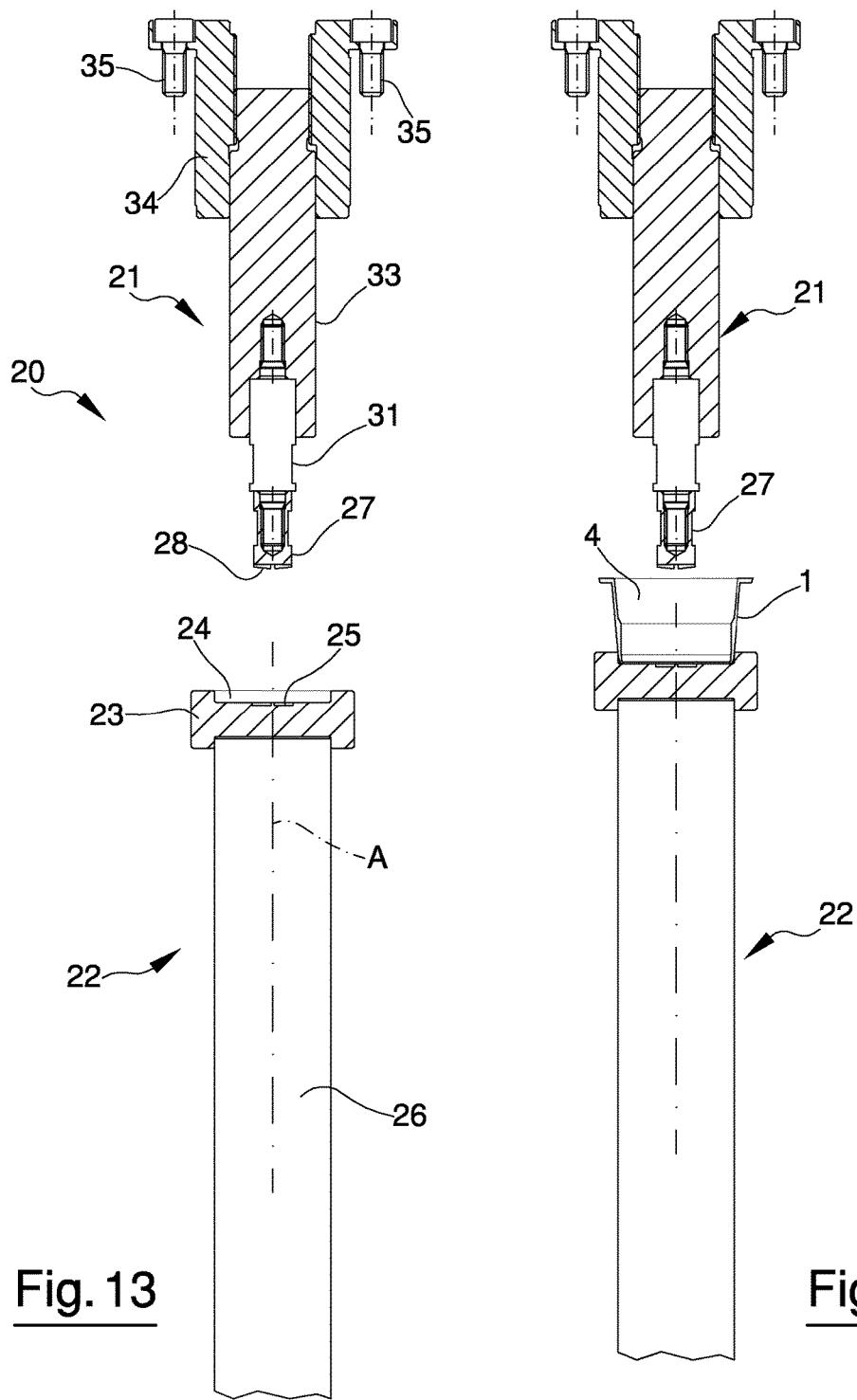

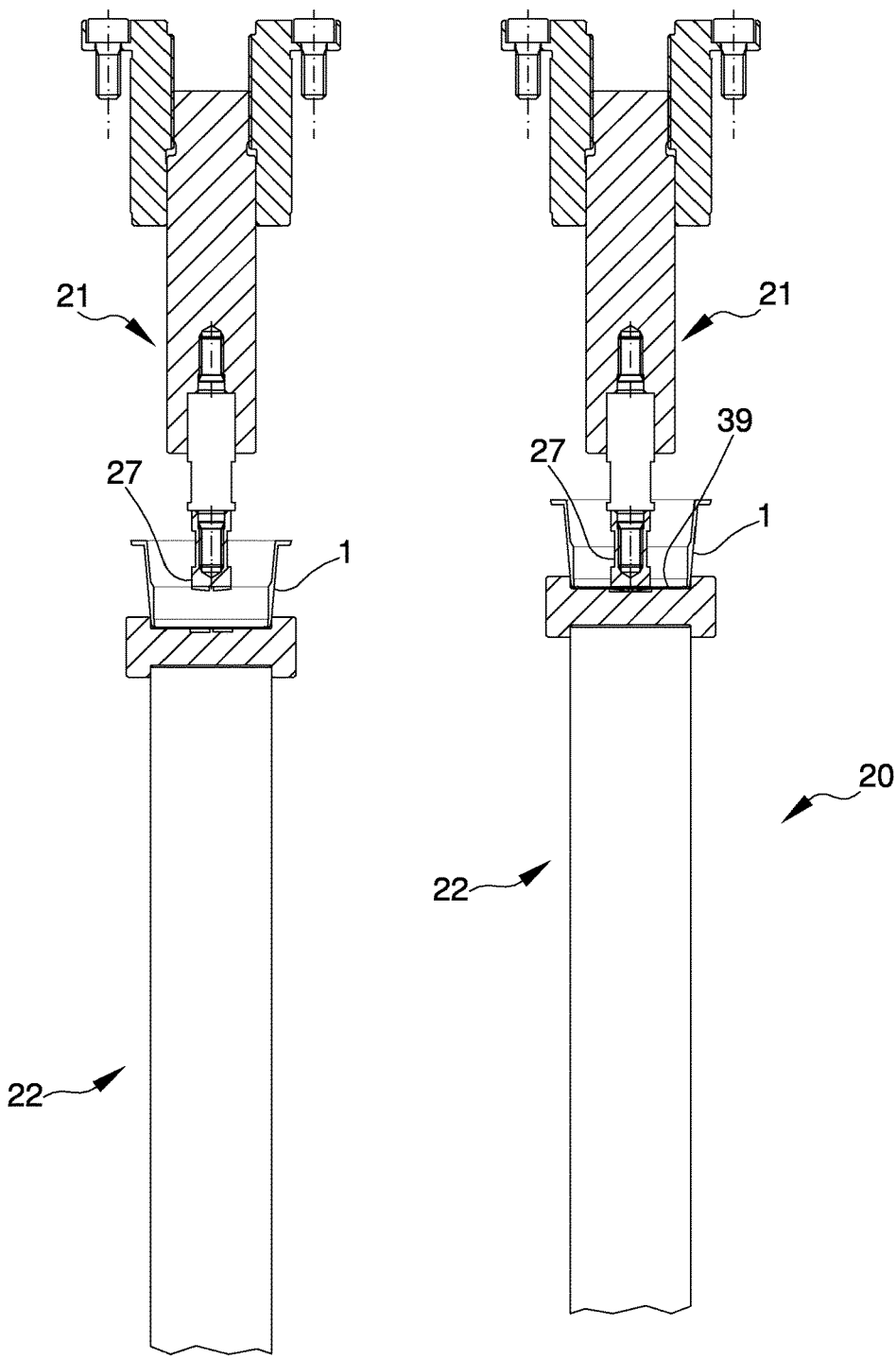

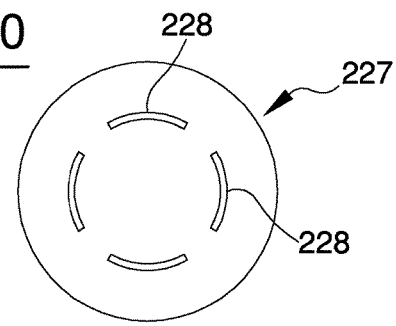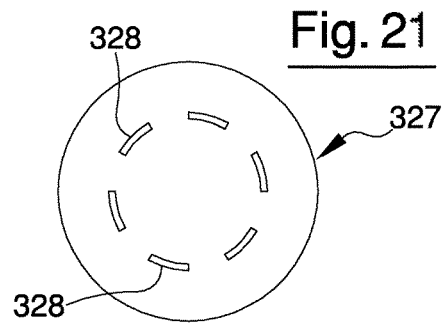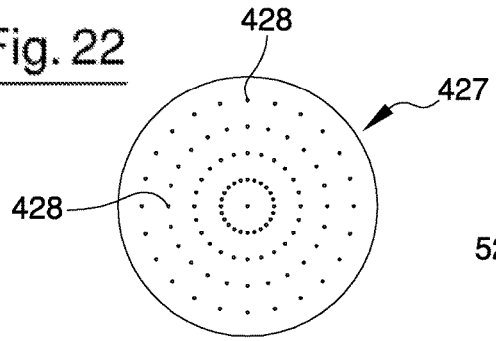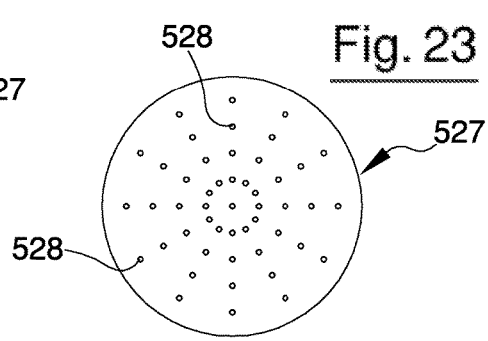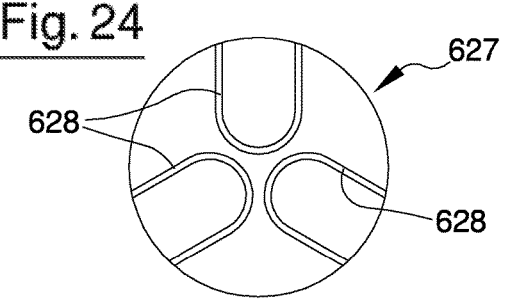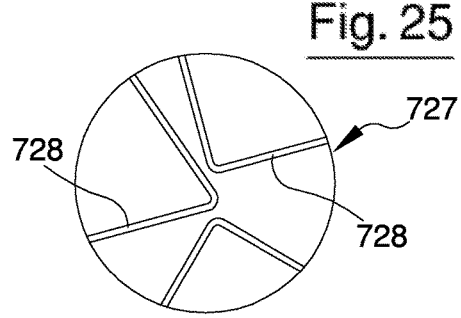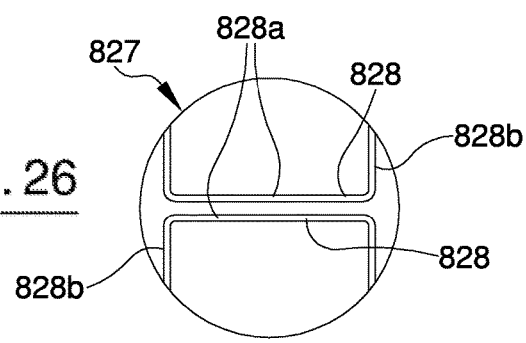

METHOD AND APPARATUS FOR PRODUCING A CAPSULE, AND THE RELATED CAPSULE

The invention relates to a method and an apparatus for producing a capsule intended to contain a product whose soluble contents will be extracted by means of a fluid, particularly a fluid under pressure. The invention further relates to a capsule intended to contain a product having at least one soluble component to be extracted by means of a fluid, particularly a fluid under pressure.

Machines are known for preparing coffee or other beverages, which use a capsule comprising a cup-shaped body closed by means of a cover. The capsule contains a product in powder form, for example ground coffee or a preparation for another beverage. When the capsule is inserted into a machine for preparing the beverage, a fluid under pressure, usually hot water, is made to pass through the capsule so as to extract the soluble components from the product in powder form, so as to obtain the desired beverage.

The cup-shaped body and/or cover of the known capsules can be provided with holes to enable the fluid under pressure to pass through the capsule inside the machine for preparing the beverage. Alternatively, the cup-shaped body and/or cover can have weakening zones that, inside the machine for preparing the beverage, are broken by the pressure of the fluid or by appropriate tools provided on the machine, so as to enable the fluid under pressure to pass through the capsule.

The cup-shaped body of the known capsules can be obtained by moulding polymeric material. In this case, the holes or weakening zones provided on the cup-shaped body are obtained during moulding of the latter, by correspondingly shaping the polymeric material inside the mould in which the cup-shaped body is formed.

However, obtaining the holes or weakening zones by moulding implies numerous drawbacks.

Firstly, a mould that is capable of forming holes is a complex mould, difficult to manufacture and liable to be easily broken. These drawbacks are accentuated if the holes that the mould must be capable of forming have a diameter of a few tenths of a millimeter. Providing a mould that is capable of forming weakening zones on the cup-shaped body is also not simple, especially if the weakening zones have a thickness of few hundredths of a millimeter. Consequently, the mould is very costly.

Moreover, producing the holes or the weakening zones by moulding implies poor flexibility in terms both of the features of the capsule and the features of the production process. In fact, if it is desired to modify the shape and/or size of the holes or of the weakening zones, it will be necessary to prepare a new mould and consequently face considerable costs. Analogously, if it is desired to change the material forming the cup-shaped body, it will be necessary to modify the design of the cup-shaped body and of the mould in order to adapt them to the new material, and thus once again prepare a new mould.

In addition, capsules provided with weakening zones cannot be produced by moulding when using multilayer materials, due to the difficulty of making the multilayer material pass, in the mould, through narrow passage areas intended to form the weakening zones. Cup-shaped bodies made from multilayer materials must therefore currently be produced using technologies other than moulding, for example by thermoforming, and then be perforated on the machine that prepares the beverage.

A further disadvantage of weakening zones produced by moulding is that such zones are delimited by rather large connection radiuses. To enable the fluid polymeric material to flow through narrow passage areas of the mould, such as the ones in which the weakening zones are formed, it is necessary to adopt radiuses of curvature that are larger than a threshold value. However, such weakening zones tend to break with difficulty when they come into contact with the fluid under pressure in the machine for preparing the beverage.

If, on the other hand, the capsule has through holes through which the fluid under pressure is intended to pass, said through holes being obtained by moulding, such holes will have a relatively large diameter for reasons connected to the production process. Consequently, the holes will allow not only the fluid under pressure to pass, but also solid particles of a relatively large size. It is thus necessary to introduce, inside the capsule, a filter to block passage of the solid particles, with a consequent complication of the capsule and increase in the associated costs.

WO 2009/050570 discloses a method for obtaining at least one through opening in an object. This method allows the through opening to be obtained by using the same forming means, which form the object by moulding.

WO 2014/026852 discloses a fillable closure used to initiate emptying of a separately fillable capsule moulded into this closure.

EP 2287090 discloses a capsule for the preparation of a coffee extract, provided with a structure facilitating perforation for injection of water, during use of the capsule.

An object of the invention is to improve the methods and apparatus for producing capsules intended to contain a product having at least one component that can be extracted by means of an extraction fluid, particularly a fluid under pressure, as well as the capsules intended to contain a product to be extracted.

A further object is to simplify the apparatus for producing capsules intended to contain a product having at least one component that can be extracted by means of a fluid, and to reduce the costs thereof accordingly. Another object is to increase flexibility of the processes and apparatus for producing capsules intended to contain a product having at least one component that can be extracted by means of a fluid.

Still another object is to provide a process and an apparatus for producing capsules intended to contain a product having at least one component that can be extracted by means of a fluid, which can easily be applied also to capsules made with multilayer materials.

A further object is to provide a process and an apparatus for producing capsules intended to contain a product having at least one component that can be extracted by means of a fluid, which make it possible to obtain weakening zones on the capsules that can be easily broken by the fluid itself.

Still a further object is to reduce the need of using filters for solid particles inside the capsule intended to contain a product having at least one component that can be extracted by means of a fluid.

In a first aspect of the invention, there is provided a method for producing an element of a capsule, the capsule being intended to contain a product having at least one component that can be extracted by means of an extraction fluid, the method comprising the step of obtaining at least one preparatory zone intended to define, during use of the capsule, a passage for the extraction fluid, so that the extraction fluid can pass through the capsule in order to extract said component, wherein the preparatory zone is obtained by means of a cutting operation carried out before the capsule is filled with said product.

The cutting operation, which allows the preparatory zone to be created, is carried out after the capsule element has been formed.

The cutting operation that creates the preparatory zone is carried out by means of a blade element.

In a second aspect of the invention, there is provided an apparatus for producing an element of a capsule, the capsule being intended to contain a product having at least one component that can be extracted by means of an extraction fluid, the apparatus comprising a forming unit for forming the capsule element, wherein the apparatus further comprises a cutting device for obtaining at least one preparatory zone intended to define, during use of the capsule, a passage for the extraction fluid, so that the extraction fluid can pass through the capsule in order to extract said component.

The cutting device comprises a blade element configured to obtain the preparatory zone after the capsule element has been formed.

In a third aspect of the invention, there is provided a capsule element for producing a capsule, the capsule being intended to contain a product having at least one component that can be extracted by means of an extraction fluid, the capsule element comprising at least one preparatory zone intended to define, during use of the capsule, a passage for the extraction fluid, so that the extraction fluid can pass through the capsule in order to extract said component, wherein the preparatory zone is obtained by means of a cutting operation carried out before the capsule is filled with said product.

Owing to these aspects of the invention, it is possible to significantly improve production of capsules intended to contain products having at least one component that can be extracted by means of an extraction fluid, in particular capsules intended to contain coffee in powder form or preparations for other beverages.

As the preparatory zone is obtained by means of a cutting operation, it is no longer necessary to form weakening zones or holes through which the extraction fluid is intended to pass, during moulding of the cup-shaped body of the capsule and/or the respective cover. The cup-shaped body and/or cover can thus be formed by means of simple, inexpensive moulds. The preparatory zones, which may or may not pass through the thickness of the cup-shaped body and/or of the cover, are formed by means of a cutting operation that can be carried out by cutting devices whose manufacture and operation are relatively simple.

Furthermore, creating the preparatory zones by cutting assures high flexibility when it comes to choosing the shape and size of the preparatory zones, the material of the cup-shaped body and/or cover, and the features of the production process. In order to modify the shape and/or size of the preparatory zones, it is in fact sufficient to modify the cutting device that makes the cuts, without acting on the mould in which the cup-shaped body and/or cover are formed. A similar reasoning can be applied if it is desired to change the material of the cup-shaped body and/or of the cover. The capsule manufacturer also has a wide margin of freedom in choosing the features of the production process, since the cutting operation by means of which the preparatory zones are formed can be carried out in the mould immediately after the cup-shaped body and/or cover have been moulded, or in any position downstream of the mould. In the latter case, the cutting device can be located on the same machine in which the cup-shaped body and/or cover are formed, or on a separate machine. Therefore, the capsule manufacturer is free to choose whether the cutting operation will be carried out on the cup-shaped body and/or on the cover when the latter are still hot after forming, or when they are already cooled.

If the preparatory zones intended to define, during use of the capsule, respective passages for the extraction fluid are weakening zones, i.e. they do not pass through the entire thickness of the cup-shaped body and/or cover, the thickness of the weakening zones can be easily selected or modified simply by setting the penetration depth of the cutting device in the material forming the cup-shaped body and/or cover. Moreover, by cutting it is possible to obtain weakening zones having a greatly reduced thickness, smaller than the thickness that would be obtainable by moulding. For example, it is possible to obtain weakening zones having a thickness of 0.1 mm, or even less.

By creating the preparatory zones by means of a cutting operation, it is also possible to produce the elements forming the capsule (i.e. the cup-shaped body and/or cover) by moulding multilayer materials. In fact, since the preparatory zones are no longer formed during moulding, the moulds for obtaining the capsule elements do not have geometries that are so complicated as to render the use of multilayer materials problematic.

Furthermore, if it is desired to obtain preparatory zones on capsule elements made with a multilayer material having a barrier layer, it will be possible to decide whether the preparatory zone must include the barrier layer or whether the latter must instead remain intact, and adjust the cutting depth of the cutting devices accordingly.

By cutting it is possible to create preparatory zones delimited by extremely small connection radiuses, much smaller than those obtainable by moulding. In other words, the preparatory zones obtained by cutting can practically be delimited by sharp corners. If the preparatory zones are weakening zones, the sharp corners delimiting them act as breakage trigger points, thus facilitating breakage of the weakening zone when the capsule comes into contact with the fluid under pressure during use.

Weakening zones created by cutting are easy to break also because the cutting devices locally cause a change in the properties of the material forming the cup-shaped body and/or cover, by weakening the material and increasing the probability of triggering breakage when the capsule comes into contact with the extraction fluid.

If, on the other hand, the preparatory zones are through cuts, after being cut the material forming the capsule element will tend to close up again in such a way that the edges that have interacted with the cutting device return substantially into contact with each other. This happens because of the elastic behaviour of the material forming the capsule element. An analogous situation occurs when the extraction fluid passes through the capsule element during use of the capsule: the cut opens, letting the extraction fluid pass, then closes up again, thus preventing the passage of the solid components contained in the capsule. Consequently, it is not necessary to use filters to hold back the solid components contained in the capsule, which facilitates production of the capsule and makes it less costly.

The capsule element can be obtained by moulding a molten polymeric material inside a mould.

Alternatively, the capsule element can be obtained by thermoforming a material in the form of a sheet or film.

In an embodiment, the cutting operation which creates the preparatory zone is carried out by cutting the capsule element from the inside towards the outside.

Alternatively, the cutting operation which creates the preparatory zone can be carried out by cutting the capsule element from the outside towards the inside.

The apparatus of the second aspect of the invention can comprise a rolling device in order to make the capsule element and the cutting device roll relative to each other so as to obtain the preparatory zone on a side wall of the capsule element, said side wall extending around an axis.

Alternatively, the cutting device can comprise a jaw element that supports at least one blade, said jaw element being configured to interact with a side wall of the capsule element so as to obtain the preparatory zone on the side wall.

In an embodiment, the cutting device is configured to obtain the preparatory zone by operating inside a mould in which the capsule element was formed in the forming unit.

In a fourth aspect of the invention, there is provided a capsule element for producing a capsule, the capsule being intended to contain a product having at least one component that can be extracted by means of an extraction fluid, the capsule element comprising a wall having at least one preparatory zone intended to define, during use of the capsule, a passage for the extraction fluid, so that the extraction fluid can pass through the capsule in order to extract said component, wherein the preparatory zone is defined by a cut made on a face of said wall and passing at least partially through the thickness of said wall, the cut being delimited by sides which are connected to each other along at least one connecting zone having, in a cross section, a connection radius of less than 0.1 mm.

The capsule element according to the fourth aspect of the invention comprises at least one preparatory zone that can be obtained by means of a cutting operation, and which as such has all of the advantages previously listed with reference to the first, second and third aspects of the invention.

In particular, as a result of the extremely small connection radius joining the sides of the cut, the connecting zone behaves like a sharp corner, acting as a breakage trigger point. If the preparatory zone is a weakening zone, i.e. the cut does not pass through the thickness of the capsule element, breakage of the weakening zone is thus facilitated when the capsule, during use, interacts with the extraction fluid. This can make it superfluous to employ punching tools on the machine which extracts the soluble components from the capsule in order to break the capsule itself.

In a fifth aspect of the invention, there is provided a capsule element for producing a capsule, the capsule being intended to contain a product having at least one component that can be extracted by means of an extraction fluid, the capsule element comprising a wall having at least one preparatory zone intended to define, during use of the capsule, a passage for the extraction fluid, so that the extraction fluid can pass through the capsule in order to extract said component, wherein the preparatory zone is defined by a cut made in said wall and passing at least partially through the thickness of said wall, said wall exhibiting stress whitening near the preparatory zone.

The capsule element according to the fifth aspect of the invention comprises at least one preparatory zone that can be obtained by means of a cutting operation, and which as such has all of the advantages previously listed with reference to the first, second and third aspects of the invention.

In particular, by cutting the wall of the capsule element to obtain the preparatory zone, a stress concentration is generated that visibly appears as stress-induced whitening nears the preparatory zone. This causes a change in the properties of the material making up the capsule element, which weakens locally and can break more easily when it interacts with the extraction fluid, even without using external tools.

In a sixth aspect of the invention, there is provided a capsule element for producing a capsule, the capsule being intended to contain a product having at least one component that can be extracted by means of an extraction fluid, the capsule element comprising a wall having at least one preparatory zone intended to define, during use of the capsule, a passage for the extraction fluid, so that the extraction fluid can pass through the capsule in order to extract said component, wherein the preparatory zone is defined by a cut made in said wall and passing at least partially through the thickness of said wall, the preparatory zone being delimited by two sides facing each other and located at a distance of less than 0.5 mm, preferably less than 0.1 mm.

The capsule element according to the sixth aspect of the invention comprises at least one preparatory zone that can be obtained by means of a cutting operation, and which as such has all of the advantages previously listed with reference to the first, second and third aspects of the invention.

In particular, by cutting the wall of the capsule element to obtain the preparatory zone, it is possible obtain a very narrow preparatory zone which, during use of the finished capsule, lets the extraction fluid pass, without allowing the solid particles of the product contained in the capsule to pass. This makes using filters in the capsule to block the solid particles superfluous.

In a seventh aspect of the invention, there is provided a capsule element for producing a capsule, the capsule being intended to contain a product having at least one component that can be extracted by means of an extraction fluid, the capsule element comprising a wall having at least one preparatory zone intended to define, during use of the capsule, a passage for the extraction fluid, so that the extraction fluid can pass through the capsule in order to extract said component, wherein the preparatory zone is defined by a cut passing at least partially through the thickness of said wall, the cut being delimited by at least two edges obtained on adjacent portions of wall, said edges being in mutual contact so that said cut is substantially closed, and wherein said adjacent portions of wall are deformed near the cut in such a manner as to protrude from the same side of said wall.

The capsule according to the seventh aspect of the invention comprises at least one preparatory zone that can be obtained by means of a cutting operation, and which as such has all of the advantages previously listed with reference to the first, second and third aspects of the invention.

In the capsule element according to the third, fourth, fifth, sixth or seventh aspect of the invention, the preparatory zone can be configured as two lines converging in a common area. In particular, said two converging lines can define an "L" shape, four preparatory zones being provided on the wall of the capsule element, distributed around one point so as to form a cross. Alternatively, the preparatory zone can be substantially punctiform.

It is also possible for the preparatory zone to be shaped like a circular arc. The invention can be better understood and carried out with reference to the appended drawings, which illustrate by way of example some non-limiting embodiments thereof, in which:

FIG. 1 is a perspective view showing a cup-shaped body of a capsule intended to contain a product having at least one component that can be extracted by an extraction fluid;

FIG. 2 is a perspective view of the cup-shaped body of FIG. 1, showing details of a base wall of the cup-shaped body;

FIG. 3 is a side view of the cup-shaped body of FIG. 1;

FIG. 4 shows a cross-section taken along the plane IV-IV of FIG. 3;

FIG. 5 is a plan view of the cup-shaped body of FIG. 1;

FIG. 6 is an enlarged, cut-off sectional view taken along the plane VI-VI of FIG. 5;

FIG. 7 is a schematic cross-section showing a portion of polymeric material cut by a cutting tool, before and after a cutting operation;

FIG. 8 is a view like the one in FIG. 7, relating to a cutting tool according to an alternative embodiment, which makes a cut passing through the thickness of the polymeric material;

FIG. 9 is a view like the one in FIG. 8, in which the cutting tool makes a cut that does not pass through the thickness of the polymeric material;

FIG. 10 is a view like the one in FIG. 7, relating to a cutting tool according to another alternative embodiment, which makes a cut passing through the thickness of the polymeric material;

FIG. 11 is a view like the one in FIG. 10, in which the cutting tool makes a cut that does not pass through the thickness of the polymeric material;

FIG. 12 is a side view of a cup-shaped body according to an alternative embodiment;

FIG. 13 is a schematic sectional view showing an initial step of a cutting operation on a cup-shaped body of a capsule;

FIG. 14 is a schematic sectional view like the one in FIG. 13, showing a subsequent step of the cutting operation;

FIG. 15 is a schematic sectional view like the one in FIG. 13, showing a further subsequent step of the cutting operation;

FIG. 16 is a schematic sectional view like the one in FIG. 13, showing a final step of the cutting operation;

FIGS. 20 to 26 are views from below of cutting tools according to respective alternative embodiments.

Figure 17:
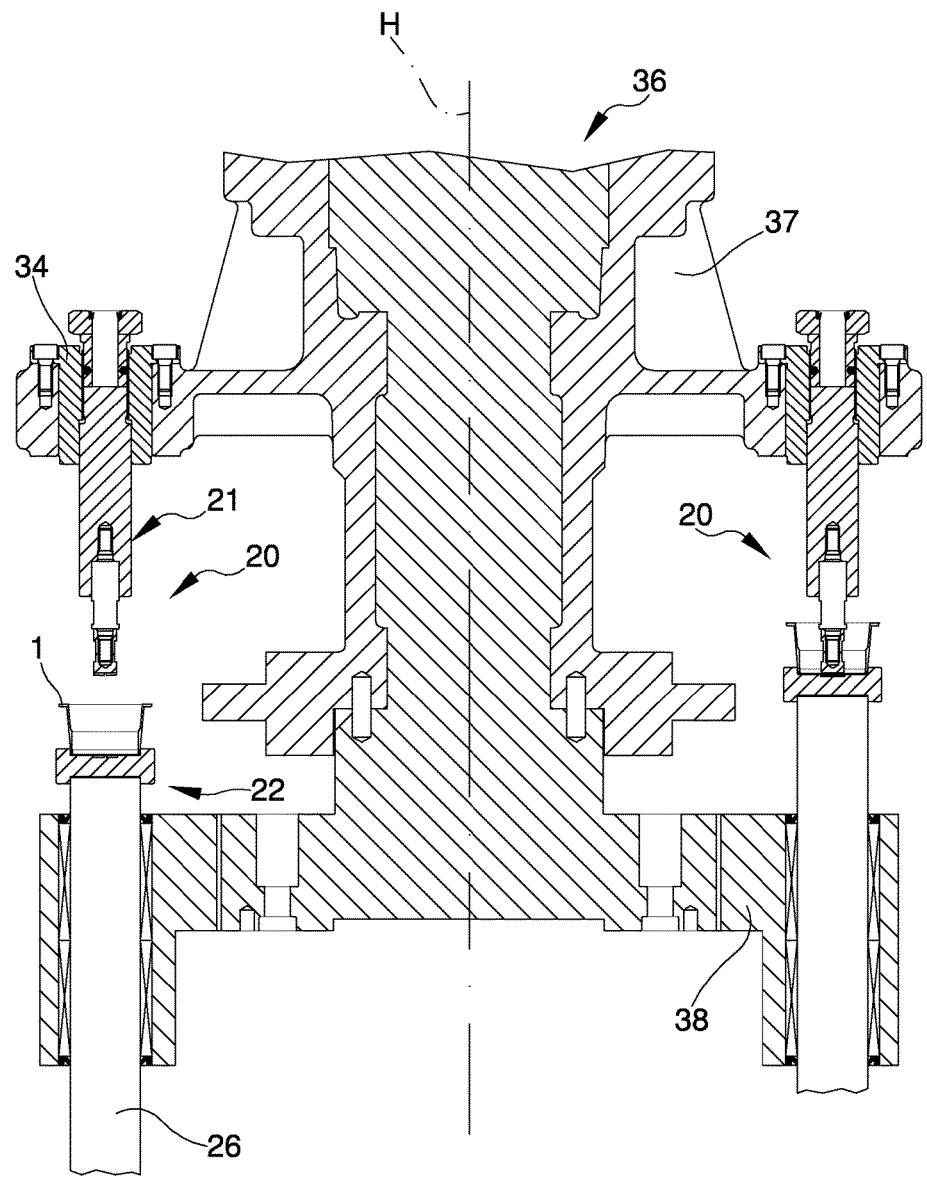
FIG. 17 is a schematic sectional view of a carousel for carrying out a cutting operation on a cup-shaped body of a capsule.

FIGS. 1 to 5 show a cup-shaped body 1 of a capsule intended to contain a product having at least one component that can be extracted by an extraction fluid. The cup-shaped body 1 comprises a side wall 2, which extends around an axis Z and a base wall 3 arranged transversely, in particular perpendicularly, to the axis Z. The side wall 2 can have a frustoconical or cylindrical shape, whereas the base wall 3 has a substantially circular shape in a plan view. The base wall 3 is joined to the side wall 2 in an end area of the side wall 2.

Between the base wall 3 and the side wall 2 a cavity 4 is defined, the cavity 4 being intended to receive the product to be extracted.

The cup-shaped body 1 further comprises a flange 5 arranged in an end area of the side wall 2, opposite the base wall 3. The flange 5 extends transversely, in particular perpendicularly, to the axis Z. The flange 5 is substantially flat and can be provided with circumferential grooves.

The capsule further comprises a cover, not illustrated, which is intended to be joined to the cup-shaped body 1 to close the cavity 4. The cover can be joined to the cup-shaped body 1 at the flange 5, for example by means of heat sealing.

The product contained in the capsule can be a foodstuff, for example in powder form. In particular, the product contained in the capsule can be suitable for obtaining a beverage. This product can be, for example, ground coffee, or a preparation for obtaining tea, milk, cappuccino or the like. Alternatively, the product contained in the capsule can be in granular form, or in gel or paste form. Other examples of a product that can be contained in the capsule are a broth concentrate, for example in granular form, or concentrated fruit juice. Non-food products might also be contained inside the capsule.

In general, the product contained in the capsule has at least one component that can be extracted by means of an extraction fluid, particularly a fluid under pressure. The extraction fluid can be a liquid such as hot or boiling water.

During use, the capsule is inserted into an extraction machine, in which, by means of openings provided for example in the cover, the extraction fluid penetrates into the cavity 4. The extraction fluid then flows out of the capsule through further openings provided, for example, in the cup-shaped body 1. When the extraction fluid passes through the capsule, it comes into contact with the product contained in the cavity 4 and extracts at least one component of that product. For example, the product contained in the capsule can pass into the extraction fluid by infusion or percolation or generically because it contains substances that are soluble in the fluid under pressure.

As shown in FIGS. 2, 4 and 5, at least one preparatory zone 6 is obtained on the base wall 3, the preparatory zone 6 being intended to define a passage for the extraction fluid when the capsule is used by the end consumer. This passage has the object of allowing the extraction fluid to flow through the capsule.

The preparatory zone 6 is defined by a cut obtained in the thickness of the material forming the cup-shaped body 1. In fact, the preparatory zone 6 is obtained by means of a cutting operation using methods that will be described in detail further below.

In the illustrated example, the preparatory zone 6 is configured as a weakening zone, i.e. as a cut that only partially passes through the thickness of the cup-shaped body 1. In this case, the weakening zone creates a passage for the extraction fluid when the capsule is used on the extraction machine, i.e. on the machine which extracts from the capsule the extractable components of the product contained therein. The passage is originated by the extraction fluid, which deforms the material making up the capsule, possibly assisted by perforating tools present on the extraction machine.

Alternatively, the preparatory zone 6 can be configured as a cut or a hole passing through the whole thickness of the cup-shaped body 1. In this case, the passage is already present in the capsule before the latter is used by the end consumer. In the extraction machine, the extraction fluid will limit itself to flowing through the already existing passage, at most deforming it or widening it as a result of its pressure.

In the illustrated example, the preparatory zone 6 is defined by two cut lines converging at a common point, so as to have an "L" shape. Other geometries of the preparatory zone 6 are possible, however, as will be better described further below.

In the illustrated example, there are provided four preparatory zones 6 distributed around the axis Z in such a way as to form a sort of cross. The number of preparatory zones 6 can nonetheless be freely chosen.

FIG. 6 shows a cross-section of the base wall 3 of the cup-shaped body 1 in order to show, in detail, the configuration of each preparatory zone 6, or, to be more precise, the configuration of each cut defining a preparatory zone 6. The cross-section of FIG. 6 is taken along a direction perpendicular to a direction along which the corresponding cut develops.

In the example in FIG. 6, the preparatory zones 6 are configured as weakening zones and extend into the material making up the cup-shaped body 1 to a depth S1 that is smaller than the thickness S of the base wall 3. At each preparatory zone 6 it is thus possible to define a bridge 9 which joins two edges of material arranged on opposite sides of the preparatory zone 6. In the example shown, the bridge 9 is on the bottom of the preparatory zone 6, though this configuration is not essential.

Each preparatory zone 6, or, to be more precise, each cut which defines a preparatory zone 6, if viewed in the cross-section of FIG. 6, is delimited by a plurality of sides which can comprise a base side 7a and two longitudinal sides or main sided 7b. The sides 7b can be rectilinear or curvilinear. The sides 7a and 7b are joined to each other at respective connecting zones 8. A connecting zone 8 has a connection radius R that can be less than 0.1 mm. Due to the small size of the connection radius R, the connecting zone 8 behaves like a sharp corner. In particular, in the connecting zone 8 there is a high stress concentration. The connecting zone 8 thus constitutes a preferential breakage trigger point. As a result, when the capsule is used on a machine for extracting the components contained inside it, the bridge 9 breaks easily in contact with the extraction fluid which is sent towards the capsule. Consequently, using perforating tools to perforate the capsule on the extraction machine can prove superfluous.

In an embodiment, the connection radius R is significantly smaller than 0.1 mm; for example it is equal to 0.05 mm or even less.

The small connection radius R of the connecting zone 8 can be obtained relatively easily because the preparatory zone 6 is the result of a cutting operation. By appropriately shaping the tool that performs the cutting operation, as will be better described further below, it is thus possible to obtain connection radiuses of small entity, significantly smaller than those that could be obtained if the preparatory zone 6 were formed by moulding. The tool that performs the cutting operation modifies the material making up the cup-shaped body 1 near the portion of cup-shaped body 1 with which it interacts, i.e. near the preparatory zone 6.

In particular, in the preparatory zone 6 the material making up the cup-shaped body 1 is deformed by the tool that performs the cutting operation, which originates a stress concentration that is visible as stress whitening. This makes it easier for the extraction fluid to deform further or break the material near the preparatory zone 6, in order to pass through the capsule. As shown in FIG. 6, the longitudinal sides 7b of the cut which defines the preparatory zone 6 are positioned at a mutual distance D, which can be less than 0.5 mm.

In an embodiment, the distance D can be less than 0.3 mm.

It is also possible to have a distance D of less than 0.1 mm.

Such small values of the distance D are possible because the cup-shaped body 1 is obtained by means of a cutting operation. In this case the material making up the cup-shaped body 1, after having been cut during the operation that has enabled the preparatory zone 6 to be obtained, tends to close up again due to a sort of elastic return, so that the sides 7b of the cut move closer together until they are at an extremely small distance D, or even substantially in contact with each other.

Naturally, when the capsule is used on the extraction machine, the sides 7b enable passage of the extraction fluid. It is however possible that, even during use on the extraction machine, if the preparatory zone 6 is suitably dimensioned, the sides 7b will remain closed off to the passage of solid particles. In this case it is not necessary to provide filters inside the capsule to block solid particles.

The geometry of the cut which defines the preparatory zone 6, as well as the distance D, depend on conformation of the cutting tool that is used to obtain the preparatory zone 6. FIGS. 7 to 11 show some examples which clarify this concept.

FIG. 7 shows a cutting tool 28a having an end 18 that is substantially flat, i.e. having a substantially rectangular cross-section, and which makes a cut that does not pass through the whole thickness of a portion 17 of material. When the cutting tool 28a moves away from the portion 17, as shown on the right side of FIG. 7, in the portion 17 there remains a cut 6a having two slightly flared facing sides, i.e. sides diverging from the inside to the outside of the portion 17. The width of the cut 6a, i.e. the average distance D between the facing sides of the cut 6a, is less than the width L of the end 18 of the cutting tool 28a, due to the elastic return of the material making up the portion 17.

With a cutting tool of this type it is also possible to obtain a cut having two substantially parallel sides 7b, like the one shown in FIG. 6.

FIG. 8 instead shows a cutting tool 28b having a relatively wide pointed end 16. The end 16 is delimited by two converging sides connected together by a flat portion. In FIG. 8, the cutting tool 28b produces a cut 6b passing through the whole thickness of the portion 17 of material.

When the cutting tool 28b disengages from the portion 17, the two faces of the portion 17 which interacted with the cutting tool 28b position themselves at a mutual distance that is less than the thickness of the end 16, due to the elastic return of the material making them up. Moreover, the edges of the cut 6b that interacted with the cutting tool 28b first, i.e. the upper edges in the example of FIG. 8, have a rounded geometry. In contrast, the edges of the cut 6b that interacted with the cutting tool 28b last, i.e. the lower edges in the example of FIG. 8, are practically like sharp corners. This is due to the different time of contact between the cutting tool 28b and the material making up the portion 17, since the edges that remained in contact with the cutting tool 28b for a longer period of time have undergone permanent deformation to a larger degree.

FIG. 9 shows the same tool 28b of FIG. 8, which has penetrated less deeply into the portion 17 of material, thus obtaining a cut 6c that does not pass through the whole thickness of the portion 17. The cut 6c has a substantially triangular shaped cross-section, i.e. it is delimited by two sides 7b which converge toward the bottom of the cut itself. Here, the two sides 7b meet in a connecting zone which can have a radius R of less than 0.1 mm.

Due to the small connection radius R, the bottom of the cut 6c acts as a breakage trigger point when the cup-shaped body interacts with the extraction fluid. This makes it easier for the extraction fluid to break the material of the cup-shaped body 1 near the preparatory zone 6, thereby transforming the non-through cut 6c into a through opening along which the extraction fluid can flow. Consequently, it is not necessary to have perforating tools on the extraction machine in order to perforate the entire thickness of the cup-shaped body 1.

An average distance of less than 0.5 mm can be defined between the sides 7b which delimit the cut 6c. This distance can also be less than 0.3 mm, or even less than 0.1 mm.

FIG. 10 shows a cutting tool 28c having a pointed end 19 that is relatively narrow compared to that of the tool 28b of FIGS. 8 and 9. The cutting tool 28c penetrates into the thickness of the portion 17 by an amount such as to generate a through cut 6d, i.e. it cuts through the entire thickness of the portion 17. Given the reduced width of the cutting tool 28c, after the cutting operation the facing sides of the cut 6d go back into mutual contact as a result of the elastic return of the material making up the portion 17. Despite being a through cut, therefore, the cut 6d is thus substantially closed.

FIG. 11 represents the same cutting tool 28c as in FIG. 10, which penetrates into the portion 17 of material by an amount such as to obtain a non-through cut 6e.

After the cutting operation, the material making up the portion 17 closes up again, so that the two facing sides of the cut 6e are substantially in mutual contact.

The facing sides of the cut 6e are joined to each other at the bottom of the cut 6e in a connecting zone having a radius R of less than 0.1 mm. Such a small connection radius substantially behaves like a sharp corner and constitutes a breakage trigger point when the extraction fluid interacts with the cup-shaped body 1 in the extraction machine. This makes it particularly easy for the extraction fluid to break the material of the cup-shaped body 1 near the cut 6e, thereby transforming the cut 6e into a through opening in which the extraction fluid can flow. In this case as well, therefore, it is superfluous to have perforating tools on the extraction machine.

In the cup-shaped body 1 shown in FIGS. 1 to 5, the base wall 3 is substantially flat, i.e. the preparatory zone 6 does not entail any deformations such as to affect planarity of the base wall 3.

FIG. 12 shows a cup-shaped body 101 according to an alternative embodiment, in which each preparatory zone 6, having the same geometry as the preparatory zones 6 shown in FIGS. 1 to 5, is delimited by portions of wall 11 which protrude from the same side of the wall on which the preparatory zones 6 are obtained, i.e. the base wall 3. In particular, the portions of wall 11 which delimit the preparatory zones 6 protrude outwardly of the cup-shaped body 101.

In other words, if the wall on which the preparatory zones 6 are obtained is a flat wall, and thus define two half-planes located on opposite sides of that wall, the portions of wall 11 that delimit a preparatory zone 6 will protrude in a same half-plane.

A similar reasoning is also applicable if the preparatory zone 6 is obtained on a wall that is not flat, for example on the side wall 2.

The above-described conformation of the portions of wall 11 is due to the fact that the preparatory zones 6 are obtained by means of a cutting operation. When the wall of the capsule is mechanically deformed by the cutting device that will create the preparatory zone 6, the cutting device plastically deforms the wall it acts upon, pushing the material forming that wall in the same direction, on both sides of the cut. If the stroke of the cutting tool is greater than a threshold value, the portions of wall corresponding to the preparatory zone will be deformed in such a way as to protrude from the same side of the wall on which they are obtained, i.e. both will protrude outwardly or both inwardly of the capsule.

As noted previously, the preparatory zones 6 are obtained by means of a cutting operation. The cutting operation is carried out before the cup-shaped body is filled and closed with its respective cover in order to obtain the capsule.

If the preparatory zone 6 is obtained on the cup-shaped body and the latter is produced by moulding a polymeric material, the cutting operation intended to obtain the preparatory zone 6 is carried out after the cup-shaped body has been moulded. In this case one may speak of "post-cutting" to obtain the preparatory zone 6, this term meaning that the cut is made after the cup-shaped body has been formed.

In particular, the cutting operation enabling the preparatory zone 6 to be obtained can be carried out when the cup-shaped body has already been removed from the mould it was formed in. The example shown in FIGS. 13 to 16 refer to this situation.

FIGS. 13 to 16 show a cutting unit 20 for obtaining the preparatory zone 6 on the base wall 3 of a cup-shaped body 1. The cutting unit 20 comprises a cutting device 21 suitable for interacting with the cup-shaped body 1 and a support device 22 for supporting the cup-shaped body 1 during cutting. The cutting device 21 and the support device 22 are facing each other.

A moving means, which is not illustrated, is also provided for moving the cutting device 21 and the support device 22 relative to each other. In the illustrated example, the moving means is associated with the support device 22 so as to move the support device 22 relative to the cutting device 21, which remains stationary. It is also possible, however, to move the support device 22 and keep the cutting device 21 stationary, or else to move both the cutting device 21 and the support device 22 simultaneously.

In the illustrated example, the support device 22 is positioned below the cutting device 21. It is also possible, however, to position the support device 22 above the cutting device 21, or to position both the cutting device 21 and the support device 22 at the same level.

As can be seen in FIG. 13, in which the cup-shaped body 1 has not been illustrated for the sake of clarity, the support device 22 comprises a support element 23 suitable for restingly receiving the base wall 3 of the cup-shaped body 1, so that the cavity 4 is accessible from above. The support element 23 can be provided with a seat 24 suitable for engaging, in a shapingly coupled manner, with a portion of the cup-shaped body 1 near the base wall 3. The seat 24 makes it possible to centre the cup-shaped body 1 relative to the support element 23 and to maintain the cup-shaped body 1 in a fixed position relative to the support element 23 during the cutting operation.

The support element 23 further has a recessed zone 25 provided inside the seat 24. In particular, the recessed zone 25 is arranged in the seat 24 in a position corresponding to the region of the base wall 3 in which the preparatory zone 6 will be obtained. The recessed zone 25 has the same geometry as the preparatory zone 6 it is desired to obtain. As will be better described below, the recessed zone 25 serves to enable the cutting device 21 to deform the material forming the base wall 3 by penetrating into the latter, without affecting planarity of the base wall 3.

The support element 23 is mounted at the upper end of a stem 26, which can be, for example, the stem of a hydraulic actuator. Alternatively, the stem 26 can be driven by a cam or by another type of mechanical actuator so as to be movable along an axis A in order to move nearer to, or away from, the cutting device 21.

The cutting device 21 comprises a cutting tool 27 arranged for interacting with the base wall 3 in order to obtain one or more preparatory zones 6 thereupon.

Figure 18:
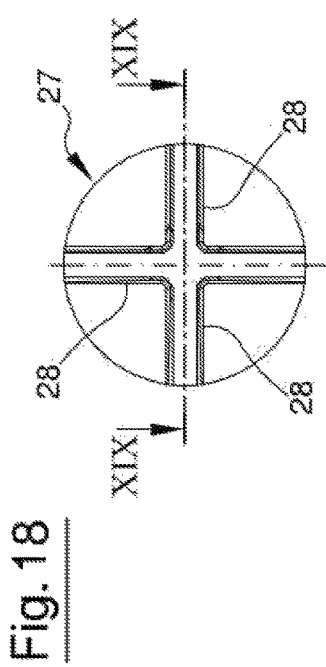
FIG. 18 is a view from below of a cutting tool for carrying out a cutting operation on a cup-shaped body of a capsule.
Figure 19:
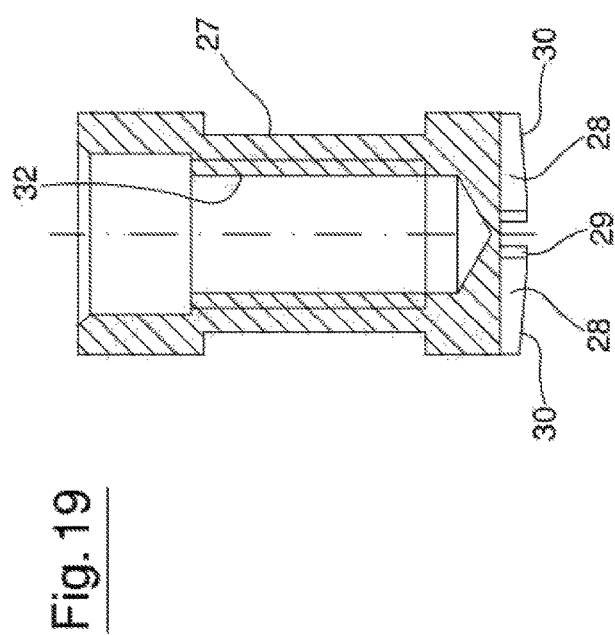
FIG. 19 is a sectional view taken along the plane XIX-XIX of FIG. 18.

As shown in FIGS. 18 and 19, the cutting tool 27 comprises, at one end thereof, at least one blade 28 suitable for cutting the material forming the base wall 3. In the illustrated example, the cutting tool 27 is suitable for obtaining four preparatory zones 6 arranged according to the conformation shown in FIGS. 1 to 5. The cutting tool 27 is thus provided with four blades 28, each of which is substantially shaped like an "L", the blades 28 being arranged to form a sort of cross. As may be seen in FIG. 19, each blade 28 has a central portion 29, which, in the illustrated example, is substantially horizontal, so as to be, during use, substantially parallel to the base wall 3 with which it interacts. Extending from the central portion 29 there is a peripheral portion 30, which is tilted relative to the central portion 29. During operation, the central portion 29 comes into contact with the base wall 3 first and penetrates into the base wall 3 to a greater depth than the peripheral portion 30. This geometry assures that the blade 28 will penetrate into the base wall 3 gradually in order to cut the material making it up.

The cutting tool 27 further comprises fixing means for fixing the cutting tool 27 to a support, particularly shaped like a shank 31, of the cutting device 21. The fixing means can comprise a threaded hole 32, in which a corresponding threaded part of the shank 31 can be engaged.

As shown in FIG. 13, the cutting device further comprises a column 33, to which the shank 31 is fixed, for example by means of a threaded connection. The column 33 can be in turn fixed to a sleeve 34, which is connected, for example by means of screws 35, to a framework of an apparatus for producing capsule elements.

As shown in FIG. 17, the apparatus for producing capsule elements can comprise a carousel 36 which supports a plurality of cutting units 20 of the type described previously. The carousel 36 can be rotatable about an axis H, particularly a vertical axis.

The cutting units 20 can be mounted in a peripheral area of the carousel 36. In particular, the sleeve 34 of the cutting device 21 of each cutting unit 20 can be fixed to a turret 37 of the carousel 36, the turret 37 being arranged in a stationary position along the axis H. The stem 26 of the support device 22 of each cutting unit 20 can instead be slidingly mounted relative to a base 38 of the carousel 36. The base 38 supports the turret 37.

During operation, the cutting unit 20 is initially in an open position, as shown in FIG. 13, in which the support element 23 is at a distance from cutting tool 27. In this position, a conveyor device, not illustrated, brings a cup-shaped body 1 onto the support device 22, in such a way that the base wall 3 is resting upon the support element 23 inside the seat 24.

The moving means moves the support device 22 towards the cutting device 21, so that the base wall 3 gradually moves closer to the cutting tool 27, as shown in FIGS. 14 and 15.

At a certain point a cutting position is reached, as is shown in FIG. 16; in this position the cutting tool 27 comes into contact with the base wall 3 of the cup-shaped body 1, in particular with an inner face 39 of the base wall 3. The cutting tool 27 cuts the inner face 39 so as to obtain one or more preparatory zones 6 on the inner face 39, according to the number and conformation of the blades 28. Whilst it is cutting the material making up the cup-shaped body 1, the cutting tool 27 can penetrate into the recessed zone 25, which is shaped in such a way as to reproduce, in negative form, the shape of the blades 28.

By adjusting the depth of penetration of the cutting tool 27 inside the base wall 3, it is possible to modify the thickness of the material of the cup-shaped body 1 that is cut by the cutting tool 27. It will thus be possible to obtain cuts passing through the entire thickness of the base wall 3, or else cuts passing only partially through the thickness of the base wall 3 to a greater or lesser extent, thereby creating a weakening zone.

After the preparatory zone 6 or preparatory zones 6 have been created, the moving means moves the support device 22 away from the cutting device 21, so that the cup-shaped body 1 stops interacting with the cutting tool 27. This movement continues until the open position is reached, in which the cup-shaped body 1 can be removed from the cutting unit 20 and a new cup-shaped body 1 can be positioned on the support device 22 in order to start a new cutting cycle.

If the cutting units 20 are mounted on a carousel 36, the sequence of operations described above will take place while the carousel is rotating about the axis H. This is shown in FIG. 17, which represents, by way of example, the open position of the cutting unit 20 (see the left side of FIG. 17) and the cutting position (see the right side of FIG. 17).

If it is desired to modify the shape, number, size or arrangement of the preparatory zones 6, it will be sufficient to modify the configuration of the cutting tool 27, in particular by replacing the cutting tool 27 mounted in the cutting unit 20 with a new cutting tool equipped with blades capable of obtaining the desired preparatory zones 6.

FIGS. 20 to 26 show a plan view of some alternative embodiments of the cutting tool. In particular, FIGS. 20 and 21 shown cutting tools configured so as to create preparatory zones shaped like circular arcs.

FIG. 20 shows a cutting tool 227 provided with four blades 228, lying on the same circumference and distributed in a regular and mutually equidistant manner around the centre of the circumference so as to create preparatory zones shaped like arcs subtending a relatively large angle at the centre.

FIG. 21, on the other hand, shows a cutting tool 327 having six blades 328, which in this case as well are distributed in a regular manner along one circumference. The blades 328 will create preparatory zones shaped like circular arcs that are smaller than those formed by the cutting device 227 shown in FIG. 20.

FIGS. 22 and 23 show examples of cutting tools configured so as to create substantially punctiform preparatory zones.

In detail, FIG. 22 shows a cutting tool 427 provided with a plurality of blades 428 configured so as to create substantially punctiform preparatory zones arranged along concentric circumferences. In particular, the cutting tool 427 enables angularly spaced preparatory zones to be obtained along each circumference. The preparatory zones of the innermost circumferences are closer to one another than the preparatory zones of the outermost circumferences. The number of preparatory zones along each circumference can be the same for all circumferences.

FIG. 23, on the other hand, shows a cutting tool 527 equipped with a plurality of blades 528 configured so as to create substantially punctiform preparatory zones that lie along concentric circumferences as in the example of FIG. 22, but have larger dimensions and are thus less numerous than in the case illustrated in FIG. 22.

FIG. 24 shows a cutting tool 627 provided with three blades 628 shaped like a "U", i.e. having two rectilinear portions connected by a semicircular portion. The semicircular portions are arranged near the axis of the cutting tool 627. In this way, three angularly equidistant "U" shaped preparatory zones will be created, with the bottoms of the "U" turned towards one another.

FIG. 25 shows an example of a cutting tool 727 provided with blades 728 configured so as to form preparatory zones that are distributed in a non-symmetrical manner relative to a centre of the base wall 3 and are not equal to one another. In particular, three blades 728 are provided, two of which are "L" shaped, whilst the third is "V" shaped.

Finally, FIG. 26 shows a cutting tool 827 provided with two blades 828, each of which has a central portion 828a facing, and parallel to, the central portion 828a of the other blade. The central portion 828a is interposed between two peripheral sections 828b, which are transversal, and in particular perpendicular, to the central portion 828a. In this manner, two preparatory zones shaped like two "Us" having respective facing bottoms are formed on the base wall 3.

Naturally, many other shapes of the preparatory zones are possible, depending on the needs and preferences of the capsule manufacturer.

FIGS. 13 to 17 show an apparatus for obtaining at least one preparatory zone 6 by means of a cutting operation carried out frontally. In fact, the cutting device 21 and the support device 22 are facing each other and aligned along the axis A, and the cutting device 21 cuts a wall of the cup-shaped body 1, in particular the base wall 3, which is positioned opposite the cutting device along the axis A.

It is also possible for the preparatory zones to be produced by cutting devices that work laterally relative to the capsule element.

For example, in addition or as an alternative to the preparatory zones 6 obtained on the bottom wall 3 of the cup-shaped body 1, it is also possible to obtain the preparatory zones 6 on the side wall 2 of the cup-shaped body 1. The preparatory zones located on the side wall 2 can also be obtained by means of a cutting operation.

In particular, it is possible to use an apparatus in which the cup-shaped body 1 is caused to roll in contact with a cutting device arranged in a stationary position, so as to bring consecutive zones of the side wall 2 to interact with the cutting device. Alternatively, it is possible to keep the cup-shaped body 1 stationary and move the cutting device along the side wall 2.

It is also possible to use a cutting device provided with jaw elements that support respective blades and form the preparatory zones by moving near to the cup-shaped body 1, which is kept stationary, so as to surround it from the outside. Alternatively, the jaw elements supporting the blades can act from the inside of the cup-shaped body 1.

Irrespective of the wall on which they are located, the preparatory zones 6 can be obtained both by cutting the material forming the cup-shaped body 1 from the inside towards the outside, as shown in FIGS. 13 to 16, and by cutting the material forming the cup-shaped body 1 from the outside towards the inside.

In the description of the figures, reference has always been made up to now to preparatory zones 6 obtained on the cup-shaped body 1. It is however also possible to obtain the preparatory zones on the cover of the capsule, in addition or as an alternative to the preparatory zones cut on the cup-shaped body 1.

Everything described previously with reference to the preparatory zones formed on the cup-shaped body 1, in particular insofar as regards the shape, geometry, depth, cutting devices and method of obtainment thereof, should be understood as applicable to the covers as well.

Both the cup-shaped body 1 and the cover can be produced by moulding a polymeric material in a specific mould. In this case, the preparatory zones are obtained by means of a cutting operation carried out after the corresponding capsule element, i.e. the cup-shaped body 1 and/or cover, has already been moulded. In particular, an example has been described in which the cutting operation that creates the preparatory zone is carried out when the capsule element has already been removed from the mould. It is also possible, however, to carry out the cutting operation that creates the preparatory zone inside the mould, after the cup-shaped body 1 and/or cover have already been formed.

Alternatively, the cup-shaped body can be obtained by thermoforming a sheet material. In this case as well, it is possible to create the preparatory zones by means of a cutting operation, for example with methods analogous to those previously described with reference to the cup-shaped body obtained by moulding. The cutting operation that creates the preparatory zone can be carried out after the cup-shaped body has already been thermoformed or else prior to thermoforming, on the sheet material that is intended to form the cup-shaped body.

The cover can comprise, for example, a moulded disk (in which case what was previously described with reference to moulding applies), or else it can be cut from a sheet material or a thin film. In the latter case, the cutting operation that creates the preparatory zone can be carried out on the sheet material or film, or after the cover has already been separated from the sheet material or film.

The cutting operation that creates the preparatory zone is in any case carried out before the cup-shaped element is filled and the capsule is closed.

The material that is cut to obtain the preparatory zone, whether it is still in the form of a sheet or film or has already been formed as a cup-shaped body or a cover, can have a constant or variable thickness. In the description of the figures, reference has always been made to cuts made in walls of constant thickness. It is however possible, particularly in the case of a capsule element obtained by moulding, that the walls delimiting the capsule element have a thickness that is not constant. This can occur, for example, on the base wall of the cup-shaped body, on which grooves of various shapes can be formed in order to obtain a turbulent motion of the extraction fluid or for other reasons. In this case, the preparatory zones obtained by cutting can also affect the thinned parts created on the base wall by the grooves. It is also possible, during moulding of the cup-shaped body and/or of the cover, to form zones of reduced thickness on which the preparatory zones will then be obtained by cutting. In this manner, passage of the extraction fluid through the preparatory zones and/or breakage of the preparatory zones on the extraction machine will be facilitated.

As regards the materials used for the cup-shaped body and/or cover, if the latter are obtained by moulding, it is possible to use any mouldable polymeric material. In particular, the material used for moulding can be a traditional polymeric material, or, alternatively, a bioplastic, or else a type of plastic that derives from renewable raw materials or is biodegradable or has both of these properties. As an example of a bioplastic for producing the cup-shaped body and/or cover one may mention polylactic acid (PLA). It is also possible to use polymeric materials of a traditional type, provided, however, that they are obtained from natural materials, as is the case, for example, of polyethylene produced from sugar cane.

Furthermore, it is also possible to use multilayer polymeric materials for the cup-shaped body and/or cover, for example materials containing at least one barrier layer, particularly but not exclusively if they are produced by moulding.

If the cup-shaped body and/or cover are produced from a sheet material or film, it is possible to use either polymeric materials or metallic materials, particularly aluminium. It is possible to use monolayer or multilayer materials also in the case of sheet materials or films.

The cutting device which enables one or more preparatory zones to be obtained on the cup-shaped body and/or cover can be, as already described previously, a device provided with blades. The latter can be sharp blades, or have a less sharp, more rounded shape, i.e. a relatively blunt shape.

The blades can be heat treated if necessary.

It is also possible to use cutting devices that do not comprise blades, for example, laser, ultrasonic (in which case the cutting tool is a sonotrode) or plasma devices. Any technique that allows a cut to be obtained can in general be used.

Irrespective of how they are obtained, and of whether they are provided on the cup-shaped body or the cover, the cuts defining the preparatory zones can pass through the entire thickness of the material they are made in, or can pass only through a portion of the thickness of the material on which the preparatory zones are created.

When the capsule is used on the extraction machine, the preparatory zones can be opened simply by the extraction fluid passing through them. In some cases, however, it is also possible to use perforating tools on the extraction machine, i.e. tools which, by perforating the capsule, will facilitate passage of the extraction fluid.

In any case, when using preparatory zones obtained by cutting, numerous advantages can be achieved, as described above in detail.

The invention claimed is:

1. A method for producing an element of a capsule, the capsule being intended to contain a product having at least one component that can be extracted by means of an extraction fluid, the method comprising the step of obtaining at least one preparatory zone intended to define, during use of the capsule, a passage for the extraction fluid, so that the extraction fluid can pass through the capsule in order to extract said component, wherein the preparatory zone is obtained by means of a cutting operation carried out before the capsule is filled with said product and after the capsule element has been formed, and wherein said cutting operation is carried out by means of a blade element.

2. A method according to claim 1, wherein the capsule element is obtained by moulding a molten polymeric material inside a mould.

3. A method according to claim 2, wherein the cutting operation which creates the preparatory zone is carried out in a cutting unit downstream of the mould.

4. A method according to claim 2, wherein the cutting operation which creates the preparatory zone is carried out inside the mould after the capsule element has been formed.

5. A method according to claim 2, wherein a thinned zone is formed on the capsule element during moulding, the preparatory zone being obtained at the thinned zone, after moulding, by means of said cutting operation.

6. A method according to claim 1, wherein the cutting operation creates a preparatory zone having a thickness that is reduced with respect to surrounding zones, so that the preparatory zone can be broken during use of the capsule, in order to enable the extraction fluid to pass through the capsule and extract said at least one extractable component from the capsule.

7. A method according to claim 1, wherein the cutting operation creates a preparatory zone which affects the entire thickness of the capsule element, so as to pass through the capsule element.

8. A method according to claim 1, wherein the preparatory zone has a shape selected from a group comprising: a punctiform shape, a shape of two lines converging in a common area, a shape of a circular arc.

9. A method according to claim 1, wherein the capsule element is made with a multilayer material having a barrier layer, and wherein a cutting depth of the blade element is so adjusted that the barrier layer remains intact at the preparatory zone.

10. A capsule element for producing a capsule, the capsule being intended to contain a product having at least one component that can be extracted by means of an extraction fluid, the capsule element comprising a wall having at least one preparatory zone intended to define, during use of the capsule, a passage for the extraction fluid, so that the extraction fluid can pass through the capsule in order to extract said component, wherein the preparatory zone is defined by a cut made on a face of said wall and passing at least partially through the thickness of said wall, the cut being delimited by sides which are connected to each other along at least one connecting zone having, in a cross-section, a connection radius of less than 0.1 mm.

11. A capsule element according to claim 10, wherein the sides that delimit the cut comprise two main sides which from said face penetrate inwardly of said wall and a base side interposed between the two main sides, the connection zone being obtained between the base side and each of the two main sides.

12. A capsule element according to claim 10, wherein the sides that delimit the cut comprise two sides joined to each other on the bottom of the cut and possibly placed in contact with each other, the connection zone being obtained between said two sides.

13. A capsule element according to claim 10, wherein said wall exhibits stress whitening near the preparatory zone.

14. A capsule element according to claim 10, wherein the cut is delimited by at least two edges obtained on adjacent portions of the wall, and wherein said adjacent portions of the wall are deformed near the cut in such a manner as to protrude from the same side of said wall.

15. A capsule element according to claim 10, wherein the preparatory zone is obtained in a region of said wall that has a reduced thickness with respect to surrounding regions.

16. A capsule element according to claim 10, wherein the sides that delimit the cut face each other and are located at a distance of less than 0.5 mm.

17. An apparatus for producing an element of a capsule, the capsule being intended to contain a product having at least one component that can be extracted by means of an extraction fluid, the apparatus comprising a forming unit for forming the capsule element, wherein the apparatus further comprises a cutting device for obtaining at least one preparatory zone intended to define, during use of the capsule, a passage for the extraction fluid, so that the extraction fluid can pass through the capsule in order to extract said component, the cutting device comprising a blade element configured to obtain the preparatory zone after the capsule element has been formed.

18. An apparatus according to claim 17, wherein the cutting device is included in a cutting unit located downstream of the forming unit.

19. An apparatus according to claim 18, wherein the cutting unit comprises a support device for supporting the capsule element while the preparatory zone is being obtained.

20. An apparatus according to claim 19, wherein the support device and the cutting device face each other and are aligned along an axis, so that said preparatory zone is carried out by the cutting device working frontally on the capsule element.

* * * * *